Oct. 17, 1950           G. A. LYON           2,525,816
WHEEL COVER
Filed March 29, 1947
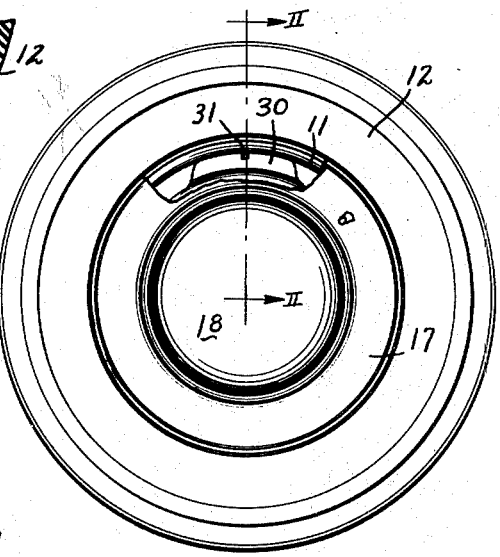
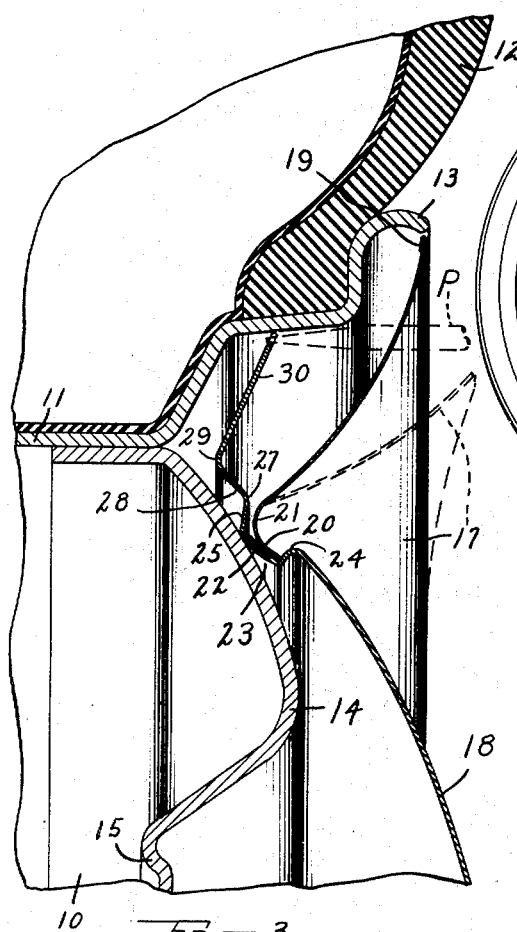
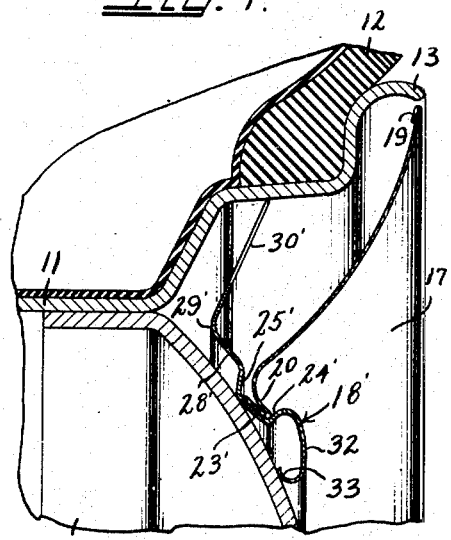
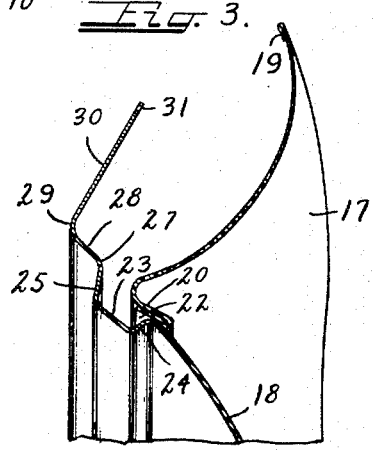
Inventor
GEORGE ALBERT LYON Patented Oct. 17, 1950

2,525,816

UNITED STATES PATENT OFFICE 2,525,816

WHEEL COVER

George Albert Lyon, Detroit, Mich.

Application March 29, 1947, Serial No. 738,078

9 Claims. (Cl. 301—37)

This invention relates to improvements in wheel structures and more particularly concerns novel wheel cover assemblies.

An important object of the present invention resides in the provision of an improved cover assembly wherein an outer cover portion of resiliently flexible plastic material is carried by an inner cover portion of relatively rigid material and formed to secure the cover to a wheel.

Another object of the invention is to provide an improved composite resiliently deflectable plastic and metal cover and in which the plastic portion of the cover assembly is adapted to be formed from exceptionally thin material.

A further object of the invention is to provide a composite cover of improved construction wherein a thin plastic trim ring cover portion is protectively and operatively carried by a metal cover portion including retaining means for securing the cover assembly to a wheel.

According to the general features of the present invention, there is provided for use with a wheel including a tire rim in a wheel body, a composite cover including a plastic trim ring portion and a metallic retaining portion wherein the retaining portion has an annular groove within which the inner margin of the trim ring is seated, such inner margin being folded upon itself to afford a double thickness reinforcing flange, the folded edge of which engages behind a retaining shoulder on the metal cover portion.

According to other general features of the invention, there is provided a composite vehicle wheel cover including a thin resiliently deflectable plastic trim ring portion and a relatively stiff metal inner cover portion, the inner margin of the trim ring portion being formed with a convexly curved flange having the margin thereof turned upon itself to afford a double thickness, the metal cover portion having an annular groove formed with a retaining shoulder, said inner marginal turned flange of the trim ring portion seating in said groove and being retained by said shoulder.

Another feature of the invention resides in the provision of retaining means on the metal cover portion for retaining engagement with a wheel.

Another feature of the invention resides in the provision of a cover which will completely cover a vehicle wheel including a tire rim and a body part, the cover comprising a hub-cap-simulating portion having at its radially outer margin means for retainingly engaging the tire rim, the hub cap cover portion being formed adjacent to its outer margin with a generally radially outwardly and axially outwardly opening groove having an annular retaining shoulder at its radially inner side, and a thin plastic trim ring having a magnitude and extent to cover the outer side of the tire rim and having its inner margin formed with a generally radially inwardly and axially outwardly curved flange with the margin of the flange turned under upon itself for reinforcement and seating within said groove and with the turned edge of the flange retainingly engaging said shoulder.

Another feature of the invention resides in the provision of a composite cover including a thin plastic trim ring portion and a relatively stiff metal retaining ring portion, the trim ring portion having the inner margin thereof folded upon itself to provide a double thickness flange extending generally radially inwardly and axially outwardly, said retaining ring portion having an annular groove therein with a generally radially outwardly and axially inwardly facing shoulder behind which said inner marginal flange of the trim ring is in engagement, the radially inner portion of said retaining ring member being formed as an ornamental bead adapted to engage a wheel body, a radially outer portion of said retaining ring member being formed with means for retainingly engaging a flange of a tire rim concealed by said trim ring.

Other objects, features and advantages of the present invention will be readily apparent from the following detailed description of a preferred embodiment thereof taken in conjunction with the accompanying drawings, in which:

Figure 1 is a side elevational view of a wheel having mounted thereon a composite cover embodying the features of the present invention, and with a portion of the cover broken away to reveal structure therebehind;

Figure 2 is a radial sectional view taken substantially on the line II—II of Figure 1;

Figure 3 is a radial sectional assembly view of the composite cover showing the trim ring portion and the inner portion of the cover in one stage of assembly; and Figure 4 is a radial sectional view on the order of Figure 2 but showing a modified form of the cover construction.

As shown on the drawings:

A wheel with which the present invention is adapted to be used comprises a wheel body 10 and a tire rim 11, the tire rim being of the multiflange, drop center type adapted for supporting a tire 12 and having a generally axially outwardly curved terminal flange 13. The wheel body is of the sheet metal stamping type of structure assembled with the base flange of the tire rim and having a generally axially outwardly extending annular reinforcing nose bulge 14 defining a central depressed bolt-on flange portion 15.

For ornamentally and protectively covering the wheel, a cover is provided as shown in Figs. 1 to 3, inclusive, including a trim ring portion 17 and a hub cap simulating and retaining portion 18.

The trim ring portion 17 of the cover is preferably formed from an exceptionally thin plastic material and is of a magnitude and extent to conceal the tire rim 11. At its outer edge the trim ring cover portion 17 is preferably bent under upon itself to provide a reinforcing flange 19. The outer diameter of the trim ring is preferably such that it will lie freely within the protective confines of the edge of the terminal flange 13 of the tire rim. The trim ring cover member 17 is preferably made from a synthetic plastic such as ethyl cellulose, cellulose acetate or vinyl resin and is characterized by being self-sustaining as to form and adapted to be manually flexed substantially without permanent deformation but always returning to its original shape when released from manual flexing pressure or pull.

From its outer edge, the trim ring cover member 17 extends generally radially inwardly and axially inwardly on a convex cross sectional curvature to an inner marginal flange 20 which extends generally radially inwardly and axially outwardly obliquely relative to the principal body portion of the trim ring, and is joined therewith by a curving juncture 21 thereby relieving the juncture of any particular concentration of bending stresses. For reinforcing the flange 20 it is provided with an underturned, return-bent reinforcing flange portion 22 which affords a double thickness for the flange. Where the trim ring is substantially white in color, it affords the general appearance of a radially inner white side wall portion of a massive tire.

The inner cover portion 18 supports the trim ring 17 by affording an annular generally radially and axially outwardly opening groove 23 within which the doubled over flange 20 seats. At its radially inner side the groove 23 is defined by an overhanging generally axially inwardly and radially outwardly facing retaining shoulder 24 against which the fold reinforced edge of the flange 20 engages retainingly. By preference the base diameter of the shoulder 24 is slightly greater than the unassembled diameter of the folded edge of the flange 20. Therefore, when the trim ring cover member 17 is assembled with the cover portion 18 by flexing the flange 20 past the radial protuberance of the shoulder 24 into the groove 23, substantially as shown in Figure 3, and the flange 20 snaps down into the groove, the radially inner or folded edge engages snugly and under slight tension against the retaining shoulder 24.

At the radially outer side of the groove 23 is provided an angular portion 25 which extends generally radially outwardly and slightly obliquely axially outwardly and affords a reinforcing flange for the margin of the cover member 18 opposing the free edge of the folded-under flange portion 22.

From the reinforcing flange 25 the margin of the inner cover member 18 extends obliquely angularly generally radially outwardly and axially inwardly to provide an axially outwardly projecting annular reinforcing rib 27 and a flange 28. At its outer margin the flange 28 is curved to provide an axially inwardly projecting annular reinforcing rib 29.

From the rib 29 extends a plurality of generally radially outwardly, axially outwardly projecting retaining flanges or fingers 30 which are adapted to engage in wedging, biting relation with the intermediate generally axially extending flange of the tire rim. There may be as many of the retaining fingers 30 as desired, four having been found satisfactory.

Each of the retaining fingers 30 may be formed at the center of its retaining edge with a pry-off tool notch 31 within which a pry-off tool P is adapted to be inserted after the retaining ring 17 has been flexed outwardly, as shown in broken outline in Figure 2, to afford access to the retaining flanges or fingers.

By reason of the curved juncture 21 with the flange 20, and the reinforced and stiffened character of the flange due to the doubling over thereof, flexure of the trim ring 17 does not tend to weaken or break the cover at or adjacent the inner marginal flange even though the flexure may be quite severe, to the extent of doubling over the cover against the inner cover member 18. Furthermore, by reason of the stiffness afforded by the doubling over of the flange 20, it is not liable to be accidentally flexed out of the retaining groove 23 in the cover 18 by reason of such necessary flexures of the cover as when the pry-off tool is to be inserted therebehind or when the cover is otherwise deflected or placed under stress.

In the fully mounted relationship of the cover, which is effected as will be apparent by merely pushing it axially inwardly until the retaining fingers 30 engage the tire rim flange, the annular axially inwardly extending reinforcing rib at the juncture of the groove portion 23 and the reinforcing flange portion 25 affords an annular seat for engaging the wheel body 10.

In the modified form of cover shown in Figure 4, the construction is substantially the same as in the form of Figures 1 and 2 except that the inner cover member identified at the 18' is formed with a reinforcing and ornamental bead 32 instead of a hub-cap simulating portion. The radially outer side of the bead provides a retaining shoulder 24', while the radially inner side of the bead is turned under into a seating flange 33 preferably making contact with the wheel body. The bead 32 is adapted to be contrastingly finished and may either be colored or may be polished to afford an ornamental appearance. Since all other features of the inner cover member 18' are the same as in the cover 18 similar portions thereof have been identified by similar reference numerals differentiated by an identifying prime sign. Details of the wheel and of the trim ring 17 may be identical with the form of Figures 1 and 2.

I claim as my invention:

1. A cover which will completely cover a vehicle wheel including a tire rim and a body part, the cover comprising a hub-cap-simulating portion having at its radially outer margin means for retainingly engaging the tire rim, the hub cap cover portion being formed adjacent to its outer margin with a generally radially outwardly and axially outwardly opening groove having an annular retaining shoulder at its radially inner side, and a thin plastic trim ring having a magnitude and extent to cover the outer side of the tire rim and having its inner margin formed with a generally radially inwardly and axially outwardly curved flange with the margin of the flange turned under upon itself for reinforcement and seating within said groove with the turned edge of the flange retainingly engaging said shoulder.

2. A composite cover including a thin plastic trim ring portion and a relatively stiff metal retaining ring portion, the trim ring portion having the inner margin thereof folded upon itself to provide a double thickness flange extending generally radially inwardly and axially outwardly, said retaining ring portion having an annular groove therein with a generally radially, outwardly and axially inwardly facing shoulder behind which said inner marginal flange of the trim ring is in engagement, the radially inner portion of said retaining ring member being formed as an ornamental bead adapted to engage a wheel body, a radially outer portion of said retaining ring member being formed with means for retainingly engaging a flange of a tire rim concealed by said trim ring.

3. As an article of manufacture, a composite vehicle wheel cover including a trim ring portion and a metal cover portion, said metal cover portion being formed with a retaining groove, and said trim ring portion being formed from a thin plastic material and having its radially inner margin doubled under upon itself to provide a flattened reinforced attachment flange, said attachment flange being retainingly engaged within the groove of the inner cover portion with the doubled under portion of the margin bottomed in the groove.

4. In combination in a cover for a wheel including a tire rim and a wheel body, a trim ring cover portion, a body covering portion, said trim ring cover portion being of generally convex cross-section and having a generally radially inwardly and axially outwardly curved inner marginal flange bent upon itself and folded under to afford a double thickness flange of increased stiffness, said inner cover portion being formed with a shoulder facing generally axially inwardly and radially outwardly and of a minimum diameter slightly greater than the diameter of the folded edge of said outer cover flange, the folded edge of said outer cover flange being retainingly engaged behind said shoulder, and means on said inner cover member extending radially beyond the juncture of the cover members and concealed by the outer cover member and engageable retainingly with the wheel.

5. In combination in a cover for a vehicle wheel including a tire rim and a wheel body, a trim ring cover portion for substantially concealing the tire rim, a body-covering portion, said trim ring cover portion being of generally convex cross-section and having a generally radially inwardly and axially outwardly curved inner marginal flange bent upon itself and folded under to afford a double thickness flange of increased stiffness, said inner cover portion being formed with a shoulder facing generally axially inwardly and radially outwardly and of minimum diameter slightly greater than the diameter of the folded edge of said outer cover flange, the folded edge of said outer cover flange being retainingly engaged behind said shoulder, and means on said inner cover member extending in radially beyond the juncture of the cover members and concealed by the outer cover member and engageable retainingly with the wheel, the radially inner portion of said inner cover member being in the form of a hub cap.

6. In combination in a cover for a vehicle wheel including a tire rim and a wheel body, a trim ring cover portion, a body covering portion, said trim ring cover portion being of generally convex cross-section and having a generally radially inwardly and axially outwardly curved inner marginal flange bent upon itself and folded under to afford a double thickness flange of increased rigidity, said inner cover portion being formed with a shoulder facing generally axially inwardly and radially outwardly and of a minimum diameter slightly greater than the diameter of the folded edge of said outer cover flange, said outer cover flange being retainingly engaged behind said shoulder, and means on said inner cover member extending in radially beyond the juncture of the cover members and concealed by the outer cover member and engageable retainingly with the wheel, the radially inner portion of said inner cover member being formed as an ornamental bead having the radially inner margin thereof turned under.

7. In a wheel structure including a flanged tire rim and a load-sustaining body portion, a cover including a trim ring annulus of thin sheet material formed with a radially outer margin to lie within the protective confines of the terminal flange of the tire rim and extending inwardly radially and axially inwardly to a point adjacent the body of the wheel and having the inner margin thereof turned generally radially inwardly and axially outwardly and then folded under and flattened upon itself for reinforcement, and an inner cover member having a groove within which said folded reinforced inner marginal flange of the trim ring annulus is retainingly seated with the turned under portion of the flange bottomed in the groove, said inner cover member seating against the body portion of the wheel and having means extending therefrom concealed behind said trim ring annulus and engaging the tire rim retainingly.

8. In a trim ring annulus, a thin sheet plastic body of generally convex cross-sectional curvature, the outer margin of the annulus being folded upon itself to provide a reinforced outer edge, the inner margin of the annulus being turned generally radially inwardly and axially outwardly to provide a flange and the flange being reinforced by a turned-under flattened portion affording a double thickness for the flange and a generally radially inwardly and axially outwardly projecting flange juncture edge adapted to engage a trim ring retaining shoulder on a supporting member.

9. In a cover structure for disposition at the outer side of a vehicle wheel including a tire rim and a body part, a circular cover member engageable with one of the wheel components and adapted to rest against the body part adjacent to the juncture of the body part with the tire rim, said cover member having a generally radially outwardly and axially outwardly opening groove formed with a relatively wide bottom portion in cross-section and having a generally radially outwardly and axially rearwardly facing shoulder at the radially inner margin of said groove bottom, and a trim ring member of a magnitude and extent to lie in substantially concealing relation to the tire rim and extending generally radially and axially inwardly on a convex cross-sectional curvature, the radially inner margin of the trim ring member being turned generally radially inwardly and axially outwardly and having an underturned flange portion flattened thereagainst to provide a double thickness generally flattened marginal reinforcing flange, said double flattened reinforcing flange seating with the doubled under portion bottomed against the bottom portion of the groove and with the turned juncture extremity of the flange retainingly engaging against said shoulder.

GEORGE ALBERT LYON.

REFERENCES CITED

The following references are of record in the file of this patent:

UNITED STATES PATENTS

| Number | Name | Date |
|---|---|---|
| 2,368,246 | Lyon | Jan. 30, 1945 |
| 2,368,247 | Lyon | Jan. 30, 1945 |
| 2,386,229 | Lyon | Oct. 9, 1945 |